Feb. 21, 1967 L. PEASE 3,304,971
SMALL LOG PLANT
Filed Feb. 24, 1964 2 Sheets-Sheet 1
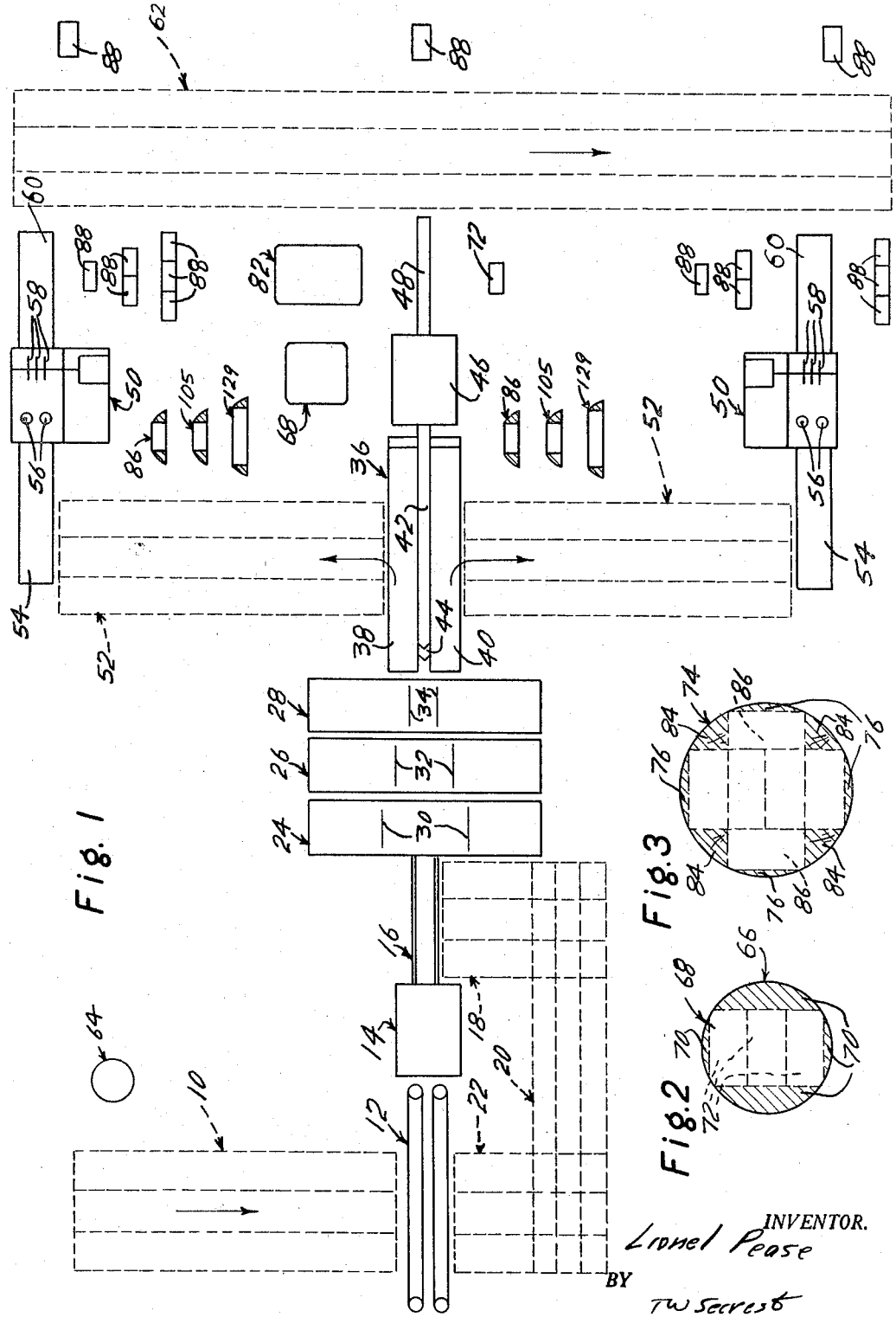
INVENTOR.
Lionel Pease
BY
TW Secrest

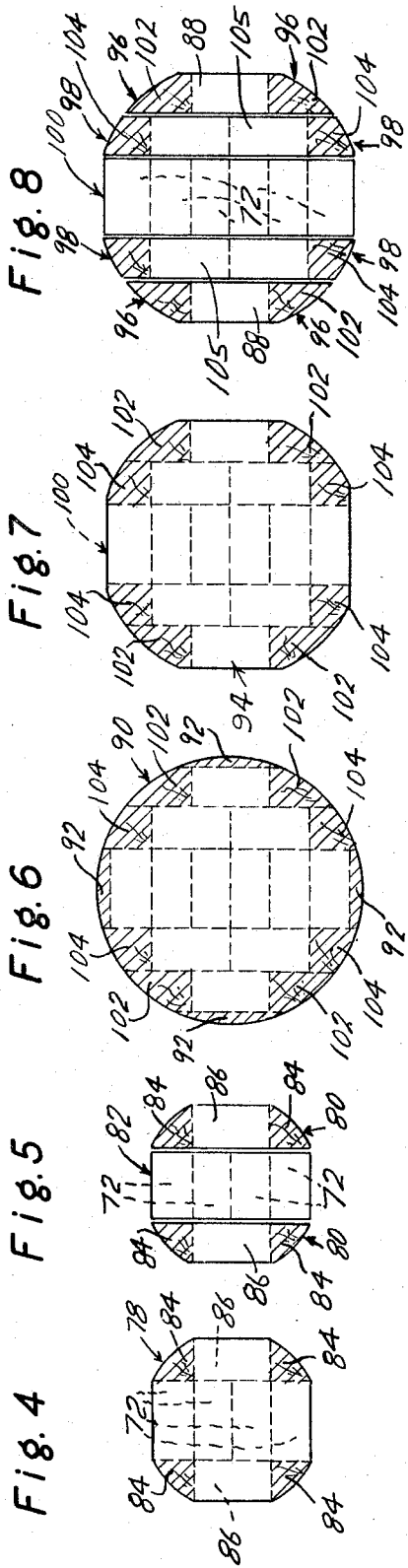
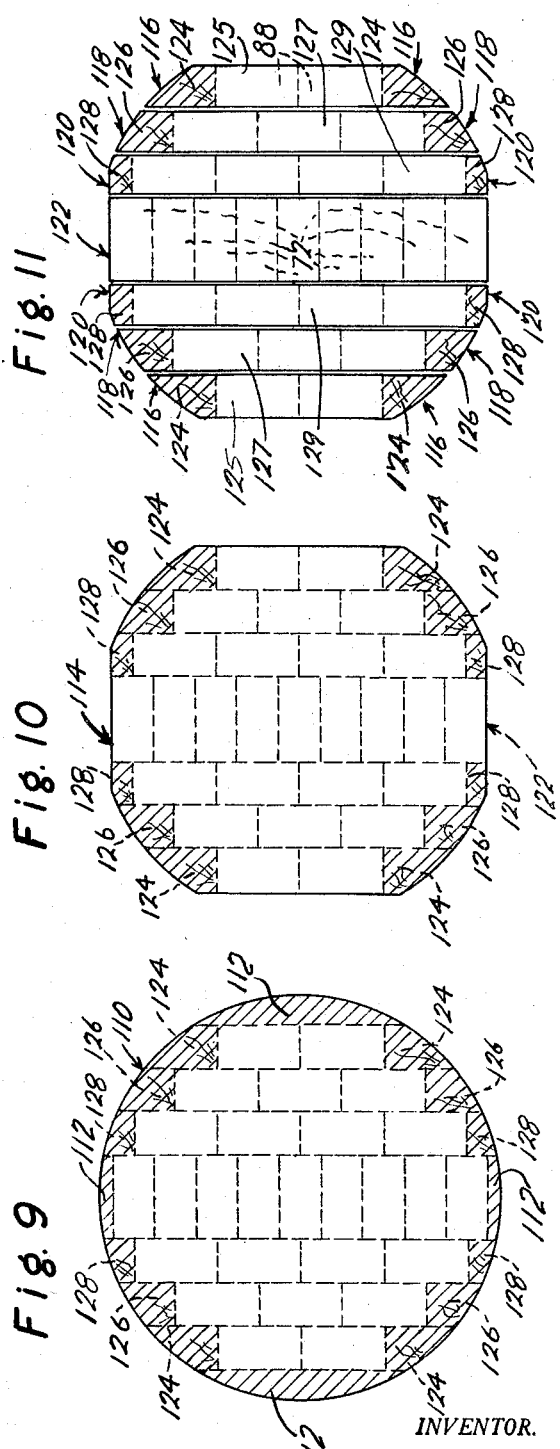

United States Patent Office 3,304,971
Patented Feb. 21, 1967

3,304,971
SMALL LOG PLANT
Lionel Pease, Seattle, Wash., assignor to Mill
Equipment, Inc., Seattle, Wash.
Filed Feb. 24, 1964, Ser. No. 346,612
5 Claims. (Cl. 144—312)

This invention is for apparatus and a process for converting small logs into cants and wood chips.

With the utilization of old stands of large timber in the United States, there is left stands of small trees having a diameter of thirty inches or less. This small timber may comprise first growth timber and also reforested areas. In other parts of the world, there are large stands of small timber, some of which are indigenous to the country, and other stands which have been planted. The handling of small timber has presented a problem as it is not economically feasible to try and use small timber. More particularly, it is necessary to cut or fell the trees; trim the branches; load the logs and unload the logs; debark the logs prior to sawing; sawing the debarked logs; discarding the waste wood from the sawed logs, usually by burning the wood; and, then the handling of the lumber from the sawed wood. Generally, the value of the lumber product is not sufficiently great to justify the processing of the small timber to lumber. As a result small timber has not been utilized and has been allowed to waste. For example, if a small tree has been accidentally felled and has laid on the ground, the tree has been allowed to rot. Further, in a logging operation if there be a small tree left standing, the same has not been harvested. In many logging operations after a stand of trees has been cut it has been necessary to burn over the area to lessen the possibility of an uncontrolled fire. In such a burning operation many small trees have been destroyed.

With this background of information, and also having worked in the lumber industry for a number of years, I have invented a combination of apparatus for working wood and also a process for working wood to make small dimensional lumber. Accordingly, it is an object of this invention to provide a combination of apparatus and a process for handling small logs, and which small logs, previously, have been too small to be made into small dimensional lumber; a process which is economically feasible in the utilization of what normally was a waste material which could not be economically used; apparatus and a process for the direct handling, by machinery, with a minimum of manual labor, small logs to make wood chips and small dimensional lumber; apparatus and a process which substantially eliminates all wastage of wood; an apparatus and process which has a high output of small dimensional lumber and wood chips per working shift; and, an apparatus which requires a minimum of floor area commensurate with a high output of small dimensional lumber and wood chips.

These and other important objects and advantages of the invention will be more particularly brought forth upon reference to the drawings, a detailed description and disclosure of the invention, and the appended claims.

In the drawings:

FIGURE 1 is a schematic illustration of a combination of woodworking equipment and a process for working small logs into wood chips and small dimensional lumber;

FIGURE 2 is an end view of approximately a six-inch diameter log and illustrates by cross-hatching that portion of the log which will be converted into wood chips and illustrates by broken lines that portion of the log which will be converted into small dimensional lumber;

FIGURE 3 is an end view of approximately an eight-inch diameter log and indicates by cross-hatching that portion of the log which will be converted into wood chips and indicates by broken lines that portion of the log which will be converted into small dimensional lumber;

FIGURE 4 is an end view of a semi-cant from approximately an eight-inch diameter log and shows by cross-hatching that portion which will be converted into wood chips and by broken lines that portion which will be converted into small dimensional lumber;

FIGURE 5 is an end view of the semi-cant of FIGURE 4 after it has been sawed into a center cant and into two side slabs;

FIGURE 6 is an end view of approximately a twelve-inch diameter log and indicates by cross-hatching that portion of the log which will be converted into wood chips and by broken lines that portion of the log which will be converted into small dimensional lumber;

FIGURE 7 is an end view of a semi-cant from the twelve-inch diameter log of FIGURE 6 and indicates by cross-hatching that portion of the log which will be converted into wood chips and by broken lines that portion of the log which will be converted into small dimensional lumber;

FIGURE 8 is an end view of the semi-cant of FIGURE 7 after it has been sawed into a center cant and into two side slabs on each side of the center cant, and shows by cross-hatching that portion of the slabs which will be converted into wood chips;

FIGURE 9 is an end view of approximately an eighteen-inch diameter log and indicates that portion of the log, by cross-hatching, which will be converted into wood chips and indicates by broken lines that portion of the log which will be converted into small dimensional lumber;

FIGURE 10 is an end view of a semi-cant from the eighteen-inch diameter log of FIGURE 9 and indicates by cross-hatching that portion of the log which will be converted into wood chips and indicates by broken lines that portion of the log which will be converted into small dimensional lumber; and FIGURE 11 is an end view of the semi-cant of FIGURE 10 after it has been sawed into a center cant and into three side slabs on each side of the center cant, and shows by cross-hatching that portion of the slabs which will be converted into wood chips.

Before describing specifically the invention it is appropriate to state that the invention comprises means for removing chips from a small log to make a cant or at least a semi-cant having rounded edges. Then the cant is sawed by passing through a multiplicity of spaced-apart paired saws to remove slabs from the cant to form a smaller cant but without rounded edges or with only slightly rounded edges. At this stage the smaller cant may pass through a gang saw to be processed into still smaller cants or small dimensional lumber such as 2" x 4" cants. If there be slabs then these slabs may pass through a chipper and edger whereby the rounded portions of the slabs are removed by chipper heads to make wood chips and the resulting plank is cut by the edger saws to form small dimensional lumber such as 2" x 4" cants.

In FIGURE 1 there is schematically illustrated a combination of apparatus or machines for converting a small log, as outlined in the previous paragraph, into wood chips and small dimensional lumber.

It is seen that there is a log deck 10 for advancing debarked logs towards a feed table 12. The feed table 12 may be of the type described in my patent application, Serial No. 339,504, filing date of January 22, 1964. The feed table 12 advances the log to a chipping machine 14.

The chipping machine 14 may be of the type described in my patent application Serial No. 405,101 filing date of Oct. 29, 1964 entitled Side, Top and Bottom Chippers, having a first set of two spaced-apart chipper heads and a second set of two spaced-apart chipper heads. The first set and the second set of chipper heads act on a log at right angles to each other so that there is produced a cant having substantially two sets of parallel sides. Instead of this type of chipping machine it may be desirable to use a chipping machine having only one set of two spaced-apart chipper heads. If such a chipping machine be employed then it may be necessary to run the resultant cant, with two rounded edges, once again through the chipping machine 14 so as to produce a cant having substantially two sets of parallel sides. In the chipping machine 14 it is desirable that the chipper heads rotate in the direction of the movement of the log and not counter to the movement of the log. With the chipper heads rotating in the direction of the movement of the log, it is possible to produce chips which may be cooked into wood pulp.

The output side of the chipping machine 14 leads onto a cant conveyor 16. Connecting with the cant conveyor 16 is a transfer chain 18. The transfer chain 18 connects with another transfer chain 20 which in turn connects with transfer chain 22. The transfer chains 18, 20 and 22 lead back to the feed table. It is seen that if the chipping machine 14 has only one set of two spaced-apart chipping heads then it is necessary to use the transfer chains 18, 20 and 22 so as to feed the cant with rounded sides back to the feed table 12 and once again run the cant with rounded sides through the chipping machine 14 so as to secure a cant having two sets of substantially parallel sides. The cant conveyor 16 connects with a multiplicity of saw assemblies 24, 26 and 28.

The three saw assemblies 24, 26 and 28, are in series or in line with each other so that the assembly 26 receives directly the output of the assembly 24, and the assembly 28 receives directly the output of the assembly 26. In the assembly 24 there are two spaced-apart saws 30. In the assembly 26 there are two spaced-apart saws 32. And, in the assembly 28 there are two spaced-apart saws 34. The saws 30, 32 and 34 are schematically illustrated in FIGURE 1. It is seen that the saws 30 are spaced farther apart from each other than the saws 32 which in turn are spaced farther apart from each other than the saws 34 are spaced apart.

The saws 30, 32 and 34 may be band saws or circular saws or other suitable saws. Also, the saw assemblies 24, 26 and 28 are available in the usual commerical channels.

The assembly 28 is connected to a side lumber and cant conveyor 36 having a first transfer apparatus 38, a second transfer apparatus 40 and a cant conveyor 42. On the front of the cant conveyor 42, juxtapositioned with respect to the assembly 28, is a kick-off gate 44. The kick-off gate 44 will kick off slabs of lumber to the first transfer apparatus 38 and the second transfer apparatus 40. The cant conveyor 42 leads into a gang saw 46.

The gang saw 46 may have eight saws for cutting the cant from the twin saws 28 into small dimensional lumber such as 2″ x 4″ cants. Such gang saws are commercially available. The output of the gang saw 46 connects with a transfer chain 48.

The transfer apparatus 38 and the transfer apparatus 40 may each lead into a side-chipper edger 50. The transfer apparatus 38 or the transfer apparatus 40 may connect with a transfer chain 52 which in turn connects with feed mechanism 54. Feed mechanism 54 connects with the side-chipper edger 50. The side-chipper edger 50 comprises two spaced-apart vertical chipper heads 56. A slab introduced between these chipper heads 56 is made into a plank. Again, the chipper heads 56 rotate in the direction of the movement of the slab and not against the movement of the slab so as to produce wood chips suitable for cooking to make wood pulp. The plank from the chipper head 56 passes through edger saws having saw blades 58. These saw blades act on the plank to make a small dimensional lumber such as 2″ x 4″ cants and the like. The output from the edger saws 58 transfers to a transfer chain 60. Transfer chain 60 connects with another transfer chain 62. The transfer chain 62 may carry the small dimensional lumber to a lumber stacker.

These edger saws can be moved on the arbor to accommodate planks of different sizes and to manufacture different sizes of small dimensional lumber. A commercially available side-chipper edger saw is described in my patent application Serial Number 297,138, filing date of July 23, 1963.

Logs of various diameters will be processed through this above combination of apparatus to make wood chips and small dimensional lumber. In FIGURE 1 there is illustrated a log 64. This log may vary in diameter from six inches to eighteen inches.

In FIGURE 2 the log 64 is assumed to have a diameter of approximately six inches and is referred to by reference numeral 66. The log 66 is fed into the chipping machine 14 so as to remove all of the log but the central core 68 identified by broken or dashed lines. That part which is removed as wood chips is cross-hatched in FIGURE 2 and is referred to by reference numeral 70. The central portion 68 remains after the wood chips have been removed and is passed through the three assemblies 24, 26 and 28. In this particular instance these saw assemblies do not cut the central portion 68. The reason for this is that the two spaced-apart saws 34, which are spaced closest to each other of the saws 30, 32 and 34, are still so far apart with respect to 68 that 68 passes between these two saws. The saws 34 may be approximately four inches apart. The center portion 68 upon leaving the saws 34 then passes to the cant conveyor 42 and into the gang saw 46 or the 2 x 4 machine 46. In the gang saw the cant 68 is cut into three 2″ x 4″ cants and transferred by the transfer chain 48 to the transfer chain 62.

In FIGURE 3 the log 64 may have a diameter of eight inches and is referred to by the reference numeral 74. The log 74 is fed into the chipping machine 14 and four small portions of the log are removed in this chipping machine. These removed portions are referred to by reference numeral 76 and are removed as wood chips. In FIGURE 3 the portion 76 is identified by single cross-hatching. The log 74 after having passed through the chipping machine 14 may be considered to have the configuration illustrated in FIGURE 4 and identified by reference numeral 78. The modified log 78 is processed to small dimensional lumber, illustrated by broken or dashed lines, and wood chips illustrated by double cross-hatching. The modified log 78 is passed through the three saw assemblies 24, 26 and 28. The saws 34 slice off two slabs 80 so as to leave a central cant section 82. One of the slabs 80 is carried on transfer apparatus 38 and the other slab 80 is carried on transfer apparatus 40. The slabs 80 are carried by transfer chains 52 to feed mechanism 54. The feed mechanism 54 carries the slabs 80, or feeds the slabs 80 between the two chipper heads 56. These chipper heads 56 remove wainscoting 84, identified by double cross-hatching, from the slabs 80 so as to leave plank 86. Plank 86 passes through the edger saws 58 to produce small dimensional lumber 88. The cant 82 is fed by cant conveyor 42 to the gang saw 46 and is there sawed into small dimensional lumber 72 such as four 2″ x 4″ cants, illustrated by broken or dashed lines in FIGURE 5.

The log 64 of FIGURE 1 becomes log 90 of FIGURE 6 and may have a diameter of approximately twelve inches. The debarked log 90 is processed through the chipping machine 14 so as to remove as wood chips those parts identified by reference numerals 92 and which are single cross-hatched in FIGURE 6. The semi-cant leaving the chipping machine 14 and passing on the cant conveyor 16 to the three saw assemblies 24, 26 and 28 may be identified by reference numeral 94. That portion of the semi-cant 94 which will be removed as wood chips is identified by double cross-hatching and reference numerals 102 and 104. The semi-cant will be sawed into small dimensional lumber as denoted by broken or dashed lines in FIGURE 7. The semi-cant 94 passes through the first saw assembly 24 and is not touched by the two spaced-apart saws 30. However, the two spaced-apart saws 32 of the second saw assembly 26 do cut the semi-cant 94 so as to remove slabs 96. In addition, the two spaced-apart saws 34 of the saw assembly 38 removes slab 98 so as to leave cant 100. The slab 96 and the slab 98 move on to the transfer mechanisms 38 and 40 and from there on the transfer chains to the feed mechanism 54. The slab 96 passes between the two chipper heads 56 to remove wainscoting 102 so as to leave small dimensional lumber 88. Likewise, the slab 98 passes between the two chipper heads 56 so as to remove wainscoting 104 so as to leave plank 105 which in turn passes through the edger saw 58 to produce small dimensional lumber 88. The double cross-hatched portions 102 and 104 of the slabs 96 and 98 are removed as wood chips. The broken or dashed lines indicate that part of the slabs which will become small dimensional lumber.

The cant 100 is fed by cant conveyor 42 to the gang saw 46 which cuts it into small dimensional lumber 72 or six 2″ x 4″ cants. These six cants are indicated by broken or dashed lines in FIGURES 6, 7 and 8. The small dimensional lumber 72 is transferred by transfer chain 62.

Similarly, the small dimensional lumber 88 is transferred by transfer chain 60 to the transfer chain 62.

Log 64 of FIGURE 1 becomes log 110 of FIGURE 9 and may be considered to be a log having a diameter of approximately eighteen inches. This log is fed by feed table 12 to chipping machine 14. Chipping machine 14 removes that portion of the log 110 identified by reference numeral 112 to make semi-cant 114. Portion 112 is removed as wood chips and is identified by single cross-hatching in FIGURE 9. The semi-cant 114 is conveyed by the cant conveyor 16 to the saw assemblies 24, 26 and 28. The two spaced-apart saws 30 of the first saw assembly 24 cuts off slabs 116. The two spaced-apart saws 32 of the second saw assembly 26 cuts off slabs 118. The two spaced-apart saws 34 of the third saw assembly 28 cuts off slabs 120. This leaves a center cant 122. The center cant 122 is conveyed by cant conveyor 42 to gang saw 46 which saws 122 into small dimensional lumber such as nine 2″ x 4″ cants 72. These nine cants are illustrated by broken or dashed lines in FIGURES 9, 10 and 11.

The slabs 116, 118 and 120 are conveyed by transfer apparatus 38 and 40 to the transfer chains 52. The transfer chains may convey these slabs to the feed mechanism 54 which feeds the slabs to the two spaced-apart chipper heads 56. The chipper heads 56 remove the part of slab 116 identified by reference numeral 124 and double cross-hatched in the form of wood chips to leave plank 125 identified by broken or dashed lines. Also, from the slab 118 the chipper heads remove the portion identified by reference numeral 126 and double cross-hatched as wood chips to leave plank 127, identified by broken or dashed lines. Likewise, from the slab 120 the chipper heads remove that portion identified by reference numeral 128 as wood chips to leave plank 129 identified by broken or dashed lines. These planks are fed to the edger saws 58 and which edger saws cut the planks into small dimensional lumber such as 2″ x 4″ cants 88.

From the above illustrations it is seen that small logs of six inches in diameter may be made into small cants or three 2″ x 4″'s. Also, a small log 74 having a diameter of approximately eight inches may be made into six 2″ x 4″'s. A log 90 having a diameter of approximately twelve inches may be made into twelve 2″ x 4″'s, and a log 110 having a diameter of approximately eighteen inches may be made into twenty-seven 2″ x 4″'s. It is to be realized that logs of other diameters may also be made into various numbers of 2″ x 4″'s and wood chips.

The small dimensional lumber 72 and 80 may be transferred on the transfer chain 62 to a lumber stacker. If this small dimensional lumber 72 and 88 is a 2″ x 4″ cant then it is a regular size 2 x 4 having cross-sectional dimensions of approximately two inches by four inches. Such a 2 x 4 may be used for construction work or rough lumber usage. With further processing such a 2 x 4 may be sanded or planed to a finished size of approximately 1⅝″ x 3⅝″.

The wood chips from these logs may be utilized in a number of different operations. For example, the wood chips, if from a suitable source, may be used in the manufacture of wood pulp. These wood chips may be digested with a sulfite cook such as magnesium bisulfite or calcium bisulfite or ammonium bisulfite to form wood pulp. Or these chips may be digested with a sulfate cook such as sodium sulfate to form wood pulp. Instead of forming wood pulp, the chips may be used in particle board construction, chip board construction, chipcore, flakeboard, pressboard and a dry process hardboard. Or, the chips may be run through a wet process under pressure and then pressed to form hardboard.

From the preceding it is seen that I have provided a combination of apparatus or machinery and a process for the utilization of small logs where, after the bark has been removed, there is no wastage in a log as the larger parts of the log may be used for small dimensional lumber and those parts which cannot be used for small dimensional lumber may be used in the form of chips for various construction materials or in the formation of wood pulp.

What I claim is:

1. Apparatus for converting logs into chips and small dimensional lumber, said apparatus comprising:
   (a) a chipping machine having a first set of two spaced-apart chipper heads and a second set of two spaced-apart chipper heads;
   (b) said first and second set of chipper heads being substantially at right angles to each other;
   (c) a multiplicity of saw assemblies in series with the chipping machine;
   (d) said saw assemblies comprising two spaced-apart saws;
   (e) said saw assemblies being arranged so that a succeeding saw assembly receives the output of the next preceding saw assembly;
   (f) a side-chipper edger in series with the saw assemblies; and,
   (g) said side-chipper edger comprising two spaced-apart chipper heads for removing of the wainscoting; and,
   (h) a multiplicity of edger saws.

2. Apparatus for converting logs into chips and small dimensional lumber, said apparatus comprising:
   (a) a chipping machine having a first set of two spaced-apart chipper heads and a second set of two spaced-apart chipper heads;
   (b) said first and second set of chipper heads being substantially at right angles to each other;
   (c) a multiplicity of saw assemblies in series with the chipping machine;
   (d) said saw assemblies comprising two-spaced apart saws;
   (e) said saw assemblies being arranged so that a succeeding saw assembly reecives the output of the next preceding saw assembly;
   (f) two side-chipper edgers;
   (g) said edgers being in series with the saw assemblies but in parallel with each other; and,
   (h) each of said side-chipper edgers comprising two spaced-apart chipper heads for removing the wainscoting; and,
   (i) a multiplicity of edger saws.

3. Apparatus for converting logs into chips and small dimensional lumber, said apparatus comprising:
   (a) a chipping machine having a first set of two spaced-apart chipper heads and a second set of two spaced-apart chipper heads;
(b) said first and second set of chipper heads being substantially at right angles to each other;
(c) a multiplicity of saw assemblies in series with the chipping machine;
(d) said saw assemblies comprising two spaced-apart saws;
(e) said saw assemblies being arranged so that a succeeding saw assembly receives the output of the next preceding saw assembly;
(f) two side-chipper edgers;
(g) said edgers being in series with the saw assemblies but in parallel with each other;
(h) each of side-chipper edgers comprising two spaced-apart chipper heads for removing the wainscoting;
(i) a multiplicity of edger saws; and,
(j) a gang saw in series with the saw assemblies and in parallel with the two side-chipper edgers to convert the cants from the saw assemblies into small dimensional lumber.

4. A process for converting a log into chips and small dimensional lumber, said process comprising:
(a) removing wood from the log in the form of chips to make a cant;
(b) removing in a series arrangement slabs of wood from the cant by sawing the wood in a multiplicity of sawing operations so that a succeeding sawing operation receives the wood from the next preceding sawing operation to make a smaller cant;
(c) removing the wainscoting from the slabs of wood in the form of chips to form a plank; and,
(d) simultaneously sawing said plank to form a multiplicity of small cants.

5. A process for converting a log into chips and small dimensional lumber, said process comprising:
(a) removing wood from the log in the form of chips to make a cant;
(b) removing in a series arrangement slabs of wood from the cant by sawing the wood in a multiplicity of sawing operations so that a succeeding sawing operation reecives the wood from the next preceding sawing operation to make a smaller cant;
(c) removing the wainscoting from the slabs of wood in the form of chips to form a plank;
(d) simultaneously sawing said plank to form a multiplicity of small cants; and,
(e) simultaneously converting said smaller cant into still smaller cants by sawing said smaller cant.

References Cited by the Examiner

UNITED STATES PATENTS

| 418,118 | 12/1889 | Fulcher | 144—4 |
| 1,062,358 | 5/1913 | Ranger | 143—22 |
| 3,032,084 | 5/1962 | Traben | 144—3 |

FOREIGN PATENTS

| 247,558 | 4/1961 | Australia. |
| 32,149 | 1/1912 | Sweden. |

ANDREW R. JUHASZ, *Primary Examiner.*

R. J. ZLOTNIK, *Assistant Examiner.*